United States Patent
Lee et al.

(10) Patent No.: US 11,584,445 B2
(45) Date of Patent: Feb. 21, 2023

(54) VEHICLE BODY REAR CONNECTION STRUCTURE

(71) Applicants: Hyundai Motor Company, Seoul (KR); Kia Corporation, Seoul (KR)

(72) Inventors: Hae Hoon Lee, Suwon-si (KR); Sunki Choi, Hwaseong-si (KR); JungHo Lee, Suwon-si (KR); Hongsoek Yeon, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/528,580

(22) Filed: Nov. 17, 2021

(65) Prior Publication Data
US 2022/0281530 A1 Sep. 8, 2022

(30) Foreign Application Priority Data
Mar. 5, 2021 (KR) .................. 10-2021-0029255

(51) Int. Cl.
*B62D 25/08* (2006.01)
*B60R 22/34* (2006.01)
*B62D 25/04* (2006.01)
*B62D 25/20* (2006.01)

(52) U.S. Cl.
CPC ............. *B62D 25/08* (2013.01); *B60R 22/34* (2013.01); *B62D 25/04* (2013.01); *B62D 25/20* (2013.01); *B60R 2022/3402* (2013.01)

(58) Field of Classification Search
CPC ........ B62D 25/08; B62D 25/04; B62D 25/20; B62D 25/087; B62D 21/15; B60R 22/34; B60R 22/24; B60R 2022/3402
USPC ............. 296/203.01, 4, 193.08, 29, 39, 106; 280/806–808
See application file for complete search history.

(56) References Cited

U.S. PATENT DOCUMENTS 7,195,306 B2 * 3/2007 Egawa .................. B62D 25/20
296/193.07
2003/0152745 A1 * 8/2003 Wagenblast ...... B29C 66/52451
428/122

FOREIGN PATENT DOCUMENTS

JP 4022963 B2 * 12/2007
JP 6362009 B2 * 7/2018

* cited by examiner

*Primary Examiner* — Dennis H Pedder
(74) *Attorney, Agent, or Firm* — Morgan, Lewis & Bockius LLP

(57) ABSTRACT

A vehicle body rear connection structure includes an extension rear transverse that connects a pillar member disposed in a vertical direction of a vehicle body to a transverse member disposed in a width direction of the vehicle body at a rear of the vehicle body, and of which a seat belt mounting portion is formed, and a reinforcement transverse extension which is mounted on a side of the extension rear transverse, and a lower portion of which is connected to a floor panel.

19 Claims, 8 Drawing Sheets

VEHICLE BODY REAR CONNECTION STRUCTURE

CROSS-REFERENCE TO RELATED APPLICATION

The present application claims priority to Korean Patent Application No. 10-2021-0029255 filed on Mar. 5, 2021, the entire contents of which is incorporated herein for all purposes by this reference.

BACKGROUND OF THE INVENTION

Field of the Invention

The present invention relates to a vehicle body rear connection structure. More particularly, the present invention relates to a vehicle body rear connection structure configured for reinforcing the strength of the vehicle body connection portion and the function of mounting the seat belt.

Description of Related Art

In general, the seat belt mounted on the rear of the vehicle body is a structure protruded into the interior, and the protruded seat belt reduces the luggage space and deteriorates the commercial properties.

The configuration connecting the pillar member at a rear of the vehicle body and the transverse member disposed in the width direction of the vehicle body has insufficient connectivity with the floor, so additional reinforcement is required to improve durability performance.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle body rear connection structure for securing a luggage space by moving the seat belt mounting position to the cross position of the pillar member and the transverse member and improving connectivity with the floor.

A vehicle body rear connection structure according to various exemplary embodiments of the present invention may include an extension rear transverse that connects a pillar member disposed in a vertical direction of a vehicle body to a transverse member disposed in a width direction of the vehicle body at a rear of the vehicle body, and of which a seat belt mounting portion is formed, and a reinforcement transverse extension which is mounted on a side of the extension rear transverse, and a lower portion of which is connected to a floor panel.

The vehicle body rear connection structure according to various exemplary embodiments of the present invention may further include a combi-lamp panel connected to the pillar member, wherein an upper portion of the reinforcement transverse extension is connected to the combi-lamp panel.

The vehicle body rear connection structure according to various exemplary embodiments of the present invention may further include a side outer connected to the combi-lamp panel, wherein a portion of the reinforcement transverse extension is connected to the side outer.

The seat belt mounting portion may include a seat belt mounting hole formed in the extension rear transverse, wherein a retractor of a seat belt is provided inside the seat belt mounting hole.

The vehicle body rear connection structure according to various exemplary embodiments of the present invention may further include a bulk head rear transverse mounted on an inside of the extension rear transverse opposite the reinforcement transverse extension.

The extension rear transverse may include a transverse front portion connected to the floor panel, and an upper curve formed by bent from the transverse front portion and curved to connect the pillar member and the transverse member.

The bulk head rear transverse may include a transverse front flange connected to the transverse front portion, and a transverse upper flange connected to the upper curve.

The transverse upper flange may include a transverse first flange connected to a lower portion of the upper curve, and a transverse second flange spaced from the transverse first flange and connected to an upper portion of the upper curve.

The vehicle body rear connection structure according to various exemplary embodiments of the present invention may further include a back panel disposed behind the transverse member, wherein the bulk head rear transverse further includes a transverse rear flange connected to the back panel.

The vehicle body rear connection structure according to various exemplary embodiments of the present invention may further include a rear floor reinforcement connected to the floor panel and coupled to the transverse front flange of the bulk head rear transverse.

The vehicle body rear connection structure according to various exemplary embodiments of the present invention may further include a bulk head rear transverse side lower mounted to a lower portion of the seat belt mounting hole inside the extension rear transverse to The bulk head rear transverse side lower may connect the reinforcement transverse extension, the extension rear transverse and the bulk head rear transverse.

The bulk head rear transverse side lower may include a lower external flange connected to the reinforcement transverse extension, a lower front flange connected to the extension rear transverse, and a lower internal flange connected to the bulk head rear transverse.

The vehicle body rear connection structure according to various exemplary embodiments of the present invention may further include a mounting bracket that engages the extension rear transverse to mount the seat belt.

The vehicle body rear connection structure according to various exemplary embodiments of the present invention may further include a bulk head rear transverse side upper mounted on an upper portion of the seat belt mounting hole inside the extension rear transverse.

The bulk head rear transverse side upper may include an upper external flange connected to the reinforcement transverse extension, an upper front flange connected to the extension rear transverse, and an upper internal flange formed on an opposite side of the upper external flange and connected to the extension rear transverse.

The pillar member may further include a quarter internal lower connected to the extension rear transverse, wherein the upper front flange and the upper internal flange are connected to the extension rear transverse and the quarter internal lower.

A vehicle body rear connection structure according to various exemplary embodiments of the present invention may include an extension rear transverse that connects a pillar member and a transverse member at a rear of a vehicle body and has a seat belt mounting hole, and a plurality of reinforcement portions mounted adjacent to the seat belt mounting hole and forming a mounting space surrounding a retractor of a seat belt inserted into the seat belt mounting hole.

The plurality of reinforcement portions may include a reinforcement transverse extension which is mounted on the side of the extension rear transverse, and the lower portion of which is connected to a floor panel, a bulk head rear transverse mounted on an inside of the extension rear transverse opposite to the reinforcement transverse extension, a bulk head rear transverse side lower mounted to a lower portion of the seat belt mounting hole inside the extension rear transverse and a bulk head rear transverse side upper mounted on an upper portion of the seat belt mounting hole inside the extension rear transverse.

According to the vehicle body rear connection structure according to various exemplary embodiments of the present invention, it is possible to secure a luggage space by moving the position for mounting the seat belt to the cross position of the pillar member and the transverse member.

Furthermore, according to the vehicle body rear connection structure according to various exemplary embodiments of the present invention, it is possible to increase the structure strength of the pillar member and the transverse member, and improve the connectivity with the floor.

Furthermore, for the effects which may be obtained or predicted due to various exemplary embodiments of the present invention, it is to be disclosed directly or implicitly in the detailed description of various exemplary embodiments of the present invention. That is, various effects predicted according to various exemplary embodiments of the present invention will be disclosed within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
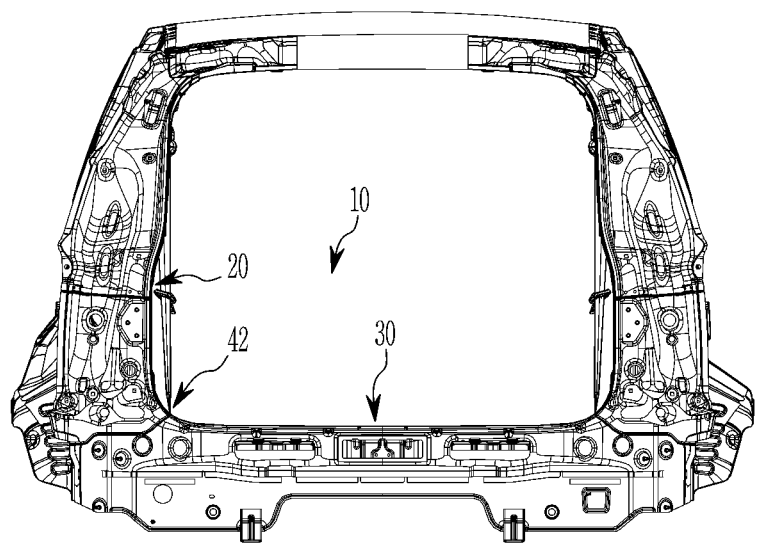
FIG. 1 is a rear view of a vehicle body rear connection structure according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

To clearly explain various exemplary embodiments of the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to the that shown in the drawings, and the thickness is enlarged to clearly express various parts and regions.

Furthermore, in the detailed description below, the reason for dividing the names of components into first, second, etc. is to classify them in the same relationship, and it is not necessarily limited to the order in the following description.

Throughout the specification, when it is said that a certain portion includes a certain constituent element, this means that other constituent elements may be further included, rather than excluding other constituent elements, unless otherwise stated.

Furthermore, terms such as . . . part, . . . means described in the specification mean a unit of a comprehensive configuration that performs at least one function or operation.

When a part, such as a layer, film, region, plate, etc., is "on" another part, it includes the case where it is directly on the other part as well as the case where there is another part in between.

In contrast, when an element is referred to as being "directly on" another element, there are no intervening elements present.

Various exemplary embodiments of the present invention will hereinafter be described in detail with reference to the accompanying drawings.

FIG. 1 is a rear view of a vehicle body rear connection structure according to various exemplary embodiments of the present invention.

Referring to FIG. 1, a vehicle body rear connection structure 10 according to various exemplary embodiments of the present invention is configured to connect a pillar member 20 disposed in a vertical direction of the vehicle body to the rear of the vehicle body and a transverse member 30 disposed in the width direction of the vehicle body. The transverse member 30 supports the rear of the vehicle body, and the tail gate, not shown, is closed, and the pillar member 20 is a pillar member disposed at the rearmost portion of the vehicle body, and may be, for example, a C pillar or a D pillar.

Figure 2:
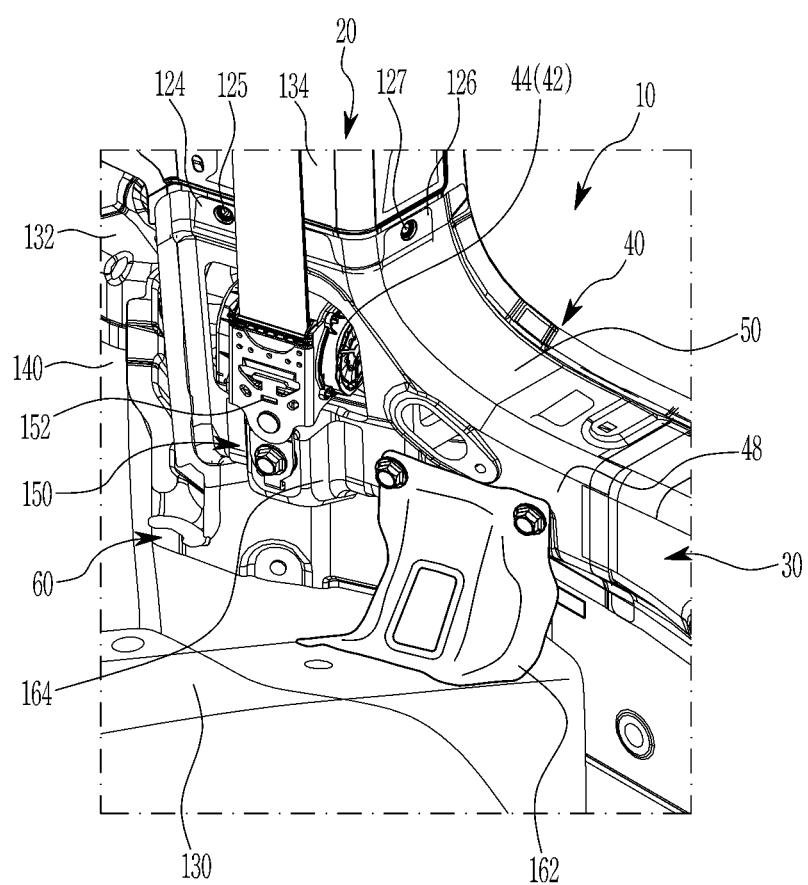
FIG. 2 is a perspective view of the vehicle body rear connection structure according to various exemplary embodiments of the present invention.

FIG. 2 is a perspective view of the vehicle body rear connection structure according to various exemplary embodiments of the present invention.

Referring to FIG. 1 and FIG. 2, the vehicle body rear connection structure 10 may include an extension rear transverse 40 of which a seat belt mounting portion 42 is formed, and a reinforcement transverse extension 60 which is mounted on the side of the extension rear transverse 40 and the lower portion of which is connected to a floor panel 130.

The reinforcement transverse extension 60 may be connected to the side of the extension rear transverse 40 and the floor panel 130 to increase the combining strength of the extension rear transverse 40 and the floor panel 130.

Furthermore, the seat belt mounting portion 42 may be mounted to the connecting position of the pillar member 20 and the transverse member 30 to secure a luggage space.

The seat belt mounting portion 42 includes a seat belt mounting hole 44 formed in the extension rear transverse 40, and a retractor 152 of a seat belt 150 may be provided inside mounting hole 44. That is, the retractor 152 of the seat belt 150 is provided inside the seat belt mounting hole 44 to secure more luggage space.

Figure 3:
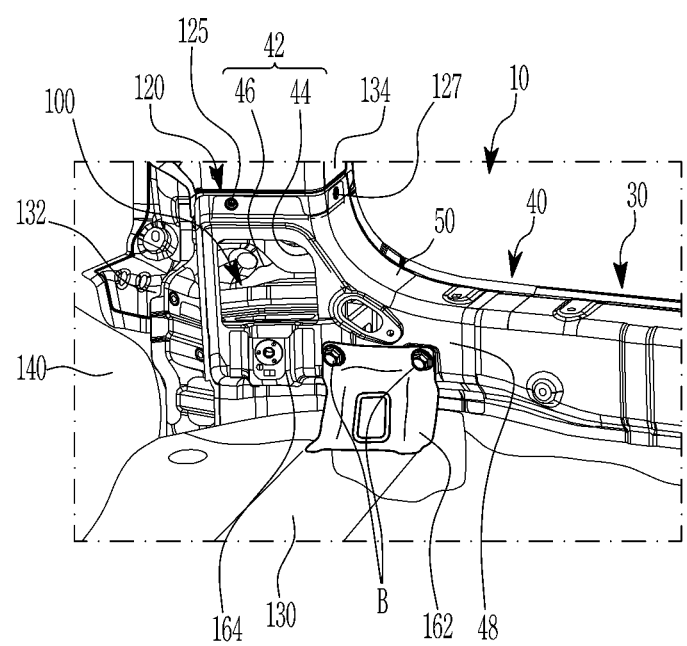
FIG. 3 is a perspective view except for a seat belt in the vehicle body rear connection structure according to various exemplary embodiments of the present invention.
Figure 4:
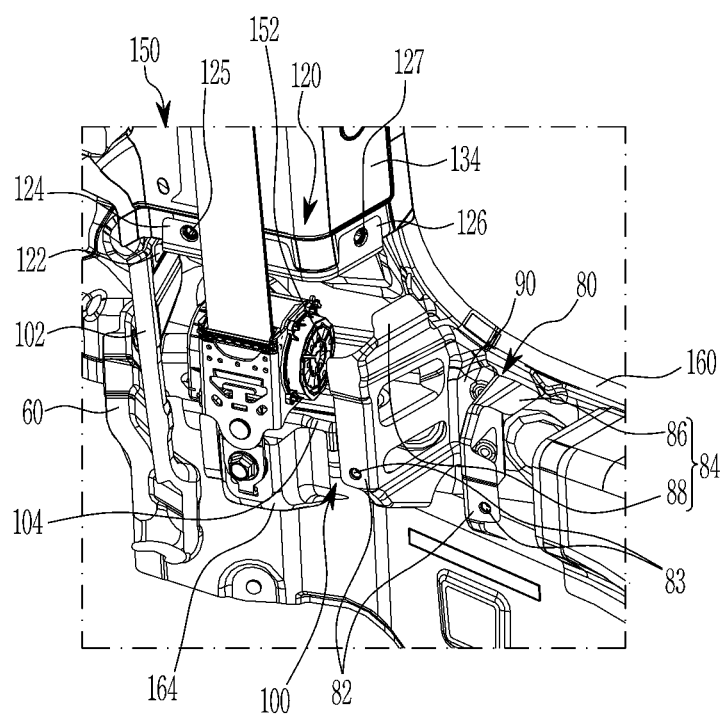
FIG. 4 is a perspective view except for an extension rear transverse in the vehicle body rear connection structure according to various exemplary embodiments of the present invention.

FIG. 3 is a perspective view except for a seat belt in the vehicle body rear connection structure according to various exemplary embodiments of the present invention, and FIG. 4 is a perspective view except for an extension rear transverse in the vehicle body rear connection structure according to various exemplary embodiments of the present invention.

Figure 5:
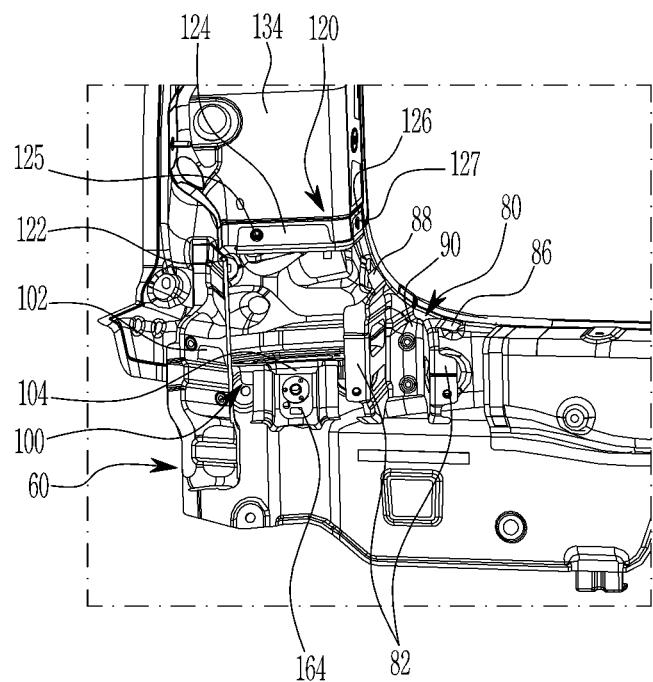
FIG. 5 is a front view excluding a seat belt and an extension rear transverse in the vehicle body rear connection structure according to various exemplary embodiments of the present invention.
Figure 6:
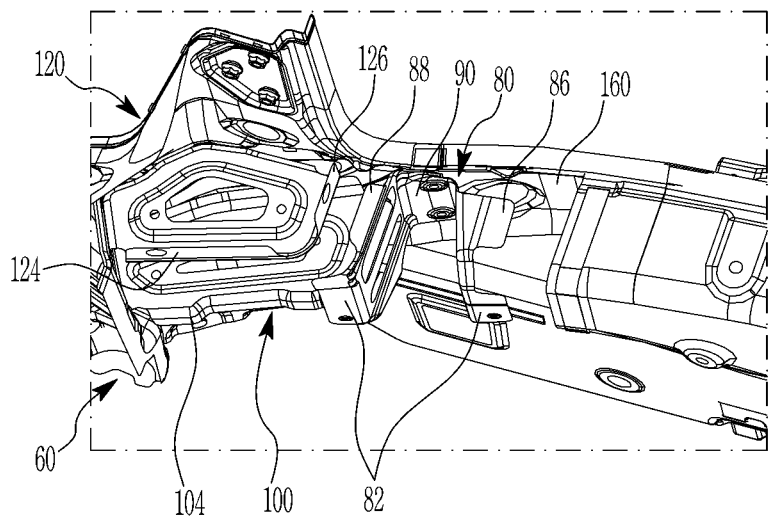
FIG. 6 is a perspective view excluding a seat belt and an extension rear transverse in the vehicle body rear connection structure according to various exemplary embodiments of the present invention.

FIG. 5 is a front view excluding a seat belt and an extension rear transverse in the vehicle body rear connection structure according to various exemplary embodiments of the present invention, and FIG. 6 is a perspective view excluding a seat belt and an extension rear transverse in the vehicle body rear connection structure according to various exemplary embodiments of the present invention.

Figure 7:
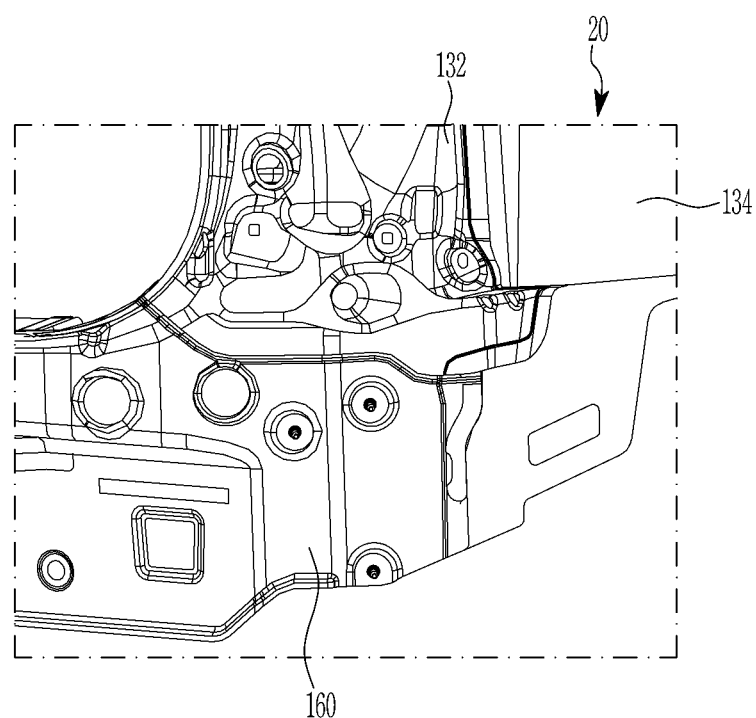
FIG. 7 is a rear perspective view of a vehicle body rear connection structure according to various exemplary embodiments of the present invention.
Figure 8:
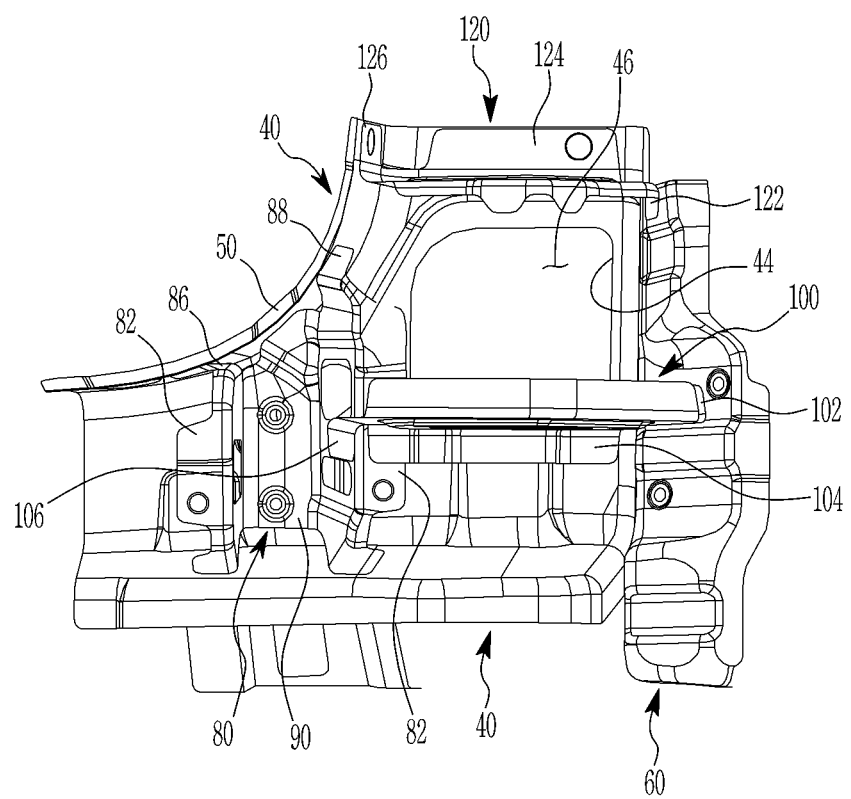
FIG. 8 is a partial rear view of a vehicle body rear connection structure according to various exemplary embodiments of the present invention.

FIG. 7 is a rear perspective view of a vehicle body rear connection structure according to various exemplary embodiments of the present invention, and FIG. 8 is a partial rear view of a vehicle body rear connection structure according to various exemplary embodiments of the present invention.

Referring to FIG. 1 to FIG. 8, the vehicle body rear connection structure 10 according to various exemplary embodiments of the present invention may further include a bulk head rear transverse 80 mounted on the opposite side of the reinforcement transverse extension 60 in the inside of the extension rear transverse 40.

The extension rear transverse 40 may include a transverse front portion 48 connected to the floor panel 130, and an upper curve 50 bent at the transverse front portion 48 and curved to connect the pillar member 20 and the transverse member 30.

The bulk head rear transverse 80 may include a transverse front flange 82 connected to the transverse front portion 48, and a transverse upper flange 84 connected to the upper curve 50.

The transverse upper flange 84 may include a transverse first flange 86 connected to the lower portion of the upper curve 50 and a transverse second flange 88 spaced from the transverse first flange and connected to the upper portion of the upper curve 50.

That is, the bulk head rear transverse 80 may be combined with the front portion and curved portion of the extension rear transverse 40 to increase the strength and connectivity of the extension rear transverse 40.

The bulk head rear transverse 80 may be joined to the extension rear transverse 40 by welding but is not limited thereto.

The vehicle body rear connection structure 10 according to various exemplary embodiments of the present invention further includes a back panel 160 disposed behind the transverse member 30, and the bulk head rear transverse 80 may further include a transverse rear flange 90 connected to the back panel 160.

That is, as shown in FIG. 6, the bulk head rear transverse 80 has an approximately "U" shape cross-section, and may increase vehicle body strength by connecting the extension rear transverse 40 positioned in front of the vehicle body and the back panel 160 positioned in the rear of the vehicle body.

The vehicle body rear connection structure 10 may further include a rear floor reinforcement 162 which is connected to the floor panel 130 and bolted to the transverse front flange 82 of the bulk head rear transverse 80.

That is, referring to FIG. 2, FIG. 3 and FIG. 4, bolt B may be connected to the transverse front flange hole 83 formed on the transverse front flange 82 to connect the rear floor reinforcement 162 and the bulk head rear transverse 80.

The rear floor reinforcement 162 may connect the floor panel 130 and the bulk head rear transverse 80 to secure vehicle body connectivity and increase strength.

Referring to FIG. 6 and FIG. 8, the vehicle body rear connection structure 10 according to various exemplary embodiments of the present invention may further include a bulk head rear transverse side lower 100 mounted on a lower portion of the seat belt mounting hole 44 within the extension rear transverse 40.

The bulk head rear transverse side lower 100 may connect the reinforcement transverse extension 60, the extension rear transverse 40 and the bulk head rear transverse 80.

The bulk head rear transverse side lower 100 may include a lower external flange 102 connected to the reinforcement transverse extension 60, a lower front flange 104 connected to the extension rear transverse 40, and a lower internal flange 106 connected to the bulk head rear transverse 80.

Referring to FIG. 2 to FIG. 5, the vehicle body rear connection structure 10 according to various exemplary embodiments of the present invention may further include a mounting bracket 164 for coupling to the extension rear transverse 40 to mount the seat belt 150.

The seat belt 150 may be mounted on the mounting bracket 164, and the lower internal flange 106 may be mounted on the opposite side of the mounting bracket 164 to distribute the load by the mounting bracket 164.

Referring to FIG. 8, the vehicle body rear connection structure 10 according to various exemplary embodiments of the present invention may further include a bulk head rear transverse side upper 120 mounted on an upper portion of the seat belt mounting hole 44 inside the extension rear transverse 40.

The bulk head rear transverse side upper 120 may include an upper external flange 122 connected to the reinforcement transverse extension 60, an upper front flange 124 connected to the extension rear transverse 40, and an upper internal flange 126 formed on the opposite side of the upper external flange 122 and connected to the extension rear transverse 40.

The pillar member 20 may further include a quarter internal lower 134 connected to the extension rear transverse 40, and the upper front flange 124 and the upper internal flange 126 may be connected to the extension rear transverse 40 and the quarter internal lower 134.

For example, the extension rear transverse 40 and the quarter internal lower 134 may be connected through the bolting holes 125 and 127 respectively formed in the upper front flange 124 and the upper internal flange 126. This can improve connectivity and increase vehicle body strength.

Referring to FIG. 2, FIG. 3 and FIG. 7, the vehicle body rear connection structure 10 according to various exemplary embodiments of the present invention further includes a combi-lamp panel 132 connected to the pillar member 20, and an upper portion of the reinforcement transverse extension 60 may be connected to the combi-lamp panel 132.

The vehicle body rear connection structure 10 according to various exemplary embodiments of the present invention further includes a side external 140 connected to the combi-lamp panel 132, and a portion of the reinforcement transverse extension 60 may be connected to the side external 140.

That is, the reinforcement transverse extension 60 may be connected to the combi-lamp panel 132 and the side external 140 to increase vehicle body strength, and the reinforcement transverse extension 60 can further be connected to the floor panel 130, thus vehicle body strength may be further increased.

As described above, the vehicle body rear connection structure 10 according to various exemplary embodiments of the present invention has the seat belt mounting hole 44 formed at the extension rear transverse 40 connecting the pillar member 20 and the transverse member 30 at the rear of the vehicle body formed to make more use of the luggage space.

Furthermore, a plurality of reinforcing portions described above are mounted adjacent to the seat belt mounting hole 44, and form a mounting space 46 surrounding the retractor 152 of the seat belt 150 inserted into the seat belt mounting hole 44 to form a mounting space 46 with the pillar member 20, so that increase the connection strength of the transverse member 30 may be increased.

That is, the reinforcement transverse extension 60, the bulk head rear transverse 80, the bulk head rear transverse side lower 100, and the bulk head rear transverse side upper 120 form the plurality of reinforcement portions to enhance connection strength of the pillar member 20 and the transverse member 30 and to mount the seat belt 150 stably. That is, the plurality of reinforcing portions form an approximately square mounting space 46, so that it is possible to increase the vehicle body strength and increase the luggage space.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle body rear connection structure comprising:
    an extension rear transverse that connects a pillar member disposed in a vertical direction of a vehicle body to a transverse member disposed in a width direction of the vehicle body at a rear of the vehicle body, and of which a seat belt mounting portion is formed; and
    a reinforcement transverse extension which is mounted on a side of the extension rear transverse, and a lower portion of which is connected to a floor panel.

2. The vehicle body rear connection structure of claim 1, further including:
    a combi-lamp panel connected to the pillar member,
    wherein an upper portion of the reinforcement transverse extension is connected to the combi-lamp panel.

3. The vehicle body rear connection structure of claim 2, further including:
    a side outer connected to the combi-lamp panel,
    wherein a portion of the reinforcement transverse extension is connected to the side outer.

4. The vehicle body rear connection structure of claim 1, wherein the seat belt mounting portion includes a seat belt mounting hole formed in the extension rear transverse, and
    wherein a retractor of a seat belt is provided inside the seat belt mounting hole.

5. The vehicle body rear connection structure of claim 4, further including:
    a bulk head rear transverse mounted on an inside of the extension rear transverse opposite to the reinforcement transverse extension.

6. The vehicle body rear connection structure of claim 5, wherein the extension rear transverse includes:
    a transverse front portion connected to the floor panel; and
    an upper curve formed to be bent from the transverse front portion and curved to connect the pillar member and the transverse member.

7. The vehicle body rear connection structure of claim 6, wherein the bulk head rear transverse includes:

a transverse front flange connected to the transverse front portion; and a transverse upper flange connected to the upper curve.

8. The vehicle body rear connection structure of claim 7, wherein the transverse upper flange includes:
   a transverse first flange connected to a lower portion of the upper curve; and
   a transverse second flange spaced from the transverse first flange and connected to an upper portion of the upper curve.

9. The vehicle body rear connection structure of claim 7, further including:
   a back panel disposed behind the transverse member,
   wherein the bulk head rear transverse further includes a transverse rear flange connected to the back panel.

10. The vehicle body rear connection structure of claim 7, further including:
    a rear floor reinforcement connected to the floor panel and coupled to the transverse front flange of the bulk head rear transverse.

11. The vehicle body rear connection structure of claim 5, further including:
    a bulk head rear transverse side lower mounted to a lower portion of the seat belt mounting hole inside the extension rear transverse.

12. The vehicle body rear connection structure of claim 11,
    wherein the bulk head rear transverse side lower connects the reinforcement transverse extension, the extension rear transverse and the bulk head rear transverse.

13. The vehicle body rear connection structure of claim 11, wherein the bulk head rear transverse side lower includes:
    a lower external flange connected to the reinforcement transverse extension;
    a lower front flange connected to the extension rear transverse; and
    a lower internal flange connected to the bulk head rear transverse.

14. The vehicle body rear connection structure of claim 13, further including:
    a mounting bracket that engages the extension rear transverse to mount the seat belt.

15. The vehicle body rear connection structure of claim 5, further including:
    a bulk head rear transverse side upper mounted on an upper portion of the seat belt mounting hole inside the extension rear transverse.

16. The vehicle body rear connection structure of claim 15, wherein the bulk head rear transverse side upper includes:
    an upper external flange connected to the reinforcement transverse extension;
    an upper front flange connected to the extension rear transverse; and
    an upper internal flange formed on an opposite side of the upper external flange and connected to the extension rear transverse.

17. The vehicle body rear connection structure of claim 16,
    wherein the pillar member includes a quarter internal lower connected to the extension rear transverse, and
    wherein the upper front flange and the upper internal flange are connected to the extension rear transverse and the quarter internal lower.

18. A vehicle body rear connection structure comprising:
    an extension rear transverse that connects a pillar member and a transverse member at a rear of a vehicle body and has a seat belt mounting hole; and
    a plurality of reinforcement portions mounted adjacent to the seat belt mounting hole and forming a mounting space surrounding a retractor of a seat belt inserted into the seat belt mounting hole.

19. The vehicle body rear connection structure of claim 18, wherein the plurality of reinforcement portions comprises:
    a reinforcement transverse extension which is mounted on a side of the extension rear transverse, and a lower portion of which is connected to a floor panel;
    a bulk head rear transverse mounted on an inside of the extension rear transverse opposite to the reinforcement transverse extension;
    a bulk head rear transverse side lower mounted to a lower portion of the seat belt mounting hole inside the extension rear transverse; and
    a bulk head rear transverse side upper mounted on an upper portion of the seat belt mounting hole inside the extension rear transverse.

* * * * *